United States Patent Office 3,092,600
Patented June 4, 1963

3,092,600
MODIFIED POLYVINYL ACETATE POWDERS
AND COMPOSITIONS
Toshio Ozawa, Higashinada Ward, Kobe, Takao Yamashita, Kyoto, and Sigeo Hayashi, Hirakata, Japan, assignors to Kanegafuchi Spinning Co., Ltd., Tokyo, Japan
No Drawing. Filed Sept. 15, 1960, Ser. No. 56,092
Claims priority, application Japan Sept. 23, 1959
5 Claims. (Cl. 260—29.6)

The present invention relates to modified polyvinyl acetate products in the form of dry powder which are quite easily re-emulsifiable or re-dispersible into water or an aqueous alkali solution, or even soluble in water or an aqueous alkali solution depending upon the extent of the modification within the range of this invention, and to the method for manufacturing such powder. This invention also relates to powdered compositions containing such modified polyvinyl acetate powder and particularly useful for various surface coating purposes, and to the method of making the same.

More particularly, the present invention relates to modified polyvinyl acetate powder products obtained by co-polymerizing vinyl acetate with about 0.3 to 50 molar percent of a monomer containing an acid group in a conventional manner, and then spray drying the resulting copolymer emulsion or solution into a finely divided powder form. Those powders thus obtained and containing up to about 3 molar percent of the monomer acid as copolymerized are easily re-emulsifiable or re-dispersible upon merely mixing with water. This capability is further improved when a dilute aqueous alkali solution is used instead of water. On the other hand, those powders wherein vinyl acetate is copolymerized with more than about 3 molar percent of the monomer acid are soluble in such aqueous alkali solution, and soluble even in water if the copolymerized acid monomer content in the modified polyvinyl acetate is more than about 20 molar percent. Furthermore, the present invention relates to a novel surface coating composition which comprises the above prepared modified polyvinyl acetate powder (in which the copolymerized acid monomer is within the range from about 0.3 to 10 molar percent) admixed with an ammonium salt of a weak acid and an oxide or hydroxide of a heavy or polyvalent metal and, if desired, further with pigments, fillers and the like. The composition is useful for various surface coating purposes and for example it may be made up into an aqueous paint whenever and in whatever amount the user desires by merely adding the desired amount of water thereto to prepare an aqueous or emulsion paint from which a water resistant coating film can be formed.

Aqueous emulsions of polyvinyl acetate are well known and have been used in large quantities for various applications including paints, finishing agents for textile materials and papers, sizing materials, adhesives, finishing agents for leather, etc.

Generally, in many of such aqueous emulsions, the solid content is around 50 to 55%. While such concentrated emulsions are considerably high in viscosity and relatively stable, they have drawbacks of degradation due to deacetylation caused by hydrolysis, particularly when they are stored for a long period of time or exposed to relatively high temperature such as in summer, and have drawbacks of breaking down by freezing. Furthermore, these emulsions are inconvenient and costful in transportation and handling because of the weight and bulkiness.

It is obvious that if polyvinyl acetate emulsions are converted into a powder form which can be re-emulsified or re-dispersible by simple addition of water to reconstitute the original emulsions, the various drawbacks as enumerated above should be overcome. There have been proposed heretofore various procedures for converting polyvinyl acetate emulsions into powders. For example, reference may be made to Farbe and Lack, vol. 63, No. 7, pp. 345–346 (1957), and United States Patent No. 2,800,463 to George O. Morrison, assignor to Shawinigan Resins Corporation.

As disclosed in these literature and patent references and as experienced by us, polyvinyl acetate has a low thermal softening point and is sensitive to heat particularly under water-absorbed state, and therefore coherence of emulsion particles occurs during the stage of drying the emulsion so that it is very difficult to produce powders which can be satisfactorily re-emulsified or re-dispersed.

Therefore it is an object of the present invention to provide modified polyvinyl acetate powder product which can satisfactorily be re-emulsified or re-dispersible upon simple mixing with water or an aqueous alkali solution to reconstitute emulsions which form a film which is comparable with or even superior to, due to the modification, that formed by conventional commercially available polyvinyl acetate emulsions.

Sometimes, for example, as warp sizing agents, paper and fabric finishing agents, adhesives, vehicles for paints, thickening agents, it is desired to employ an aqueous solution. It has been proposed heretofore to modify polyvinyl acetate by copolymerizing vinyl acetate with crotonic acid to render same alkali soluble. The modified polyvinyl acetate wherein the copolymerized crotonic acid is less than several molar percent is sold in the form of granular or pearl like solid so that when it is to be used it is dissolved in an aqueous alkali solution such as aqueous ammonia. However, it takes a long time to complete the dissolution at normal temperature so that a troublesome heating procedure must usually be accompanied. Furthermore, the particles of such granular or pearl like solid product tend to cohere with each other to form undesirable massive bodies during storage so that the dissolution operation and handling become further difficult. Copolymers whose content of maleic anhydride is relatively high (about 50 molar percent) are sold and delivered to the consumers in the form of solution, but they have various drawbacks including inconvenience in handling, transportation and storage and degradation due to hydrolysis caused by a long period of time of storage.

Therefore, it is another object of the present invention to provide modified polyvinyl acetate powders which can satisfactorily and quite easily be dissolved in an aqueous alkali solution and sometimes even in water without requiring any troublesome procedure and drawbacks encountered in the known products.

While these modified polyvinyl acetate powders according to one aspect of our invention are quite easily re-emulsified or dissolved as mentioned above and can be easily handled and used even for domestic application even by unskilled persons, it is required that, when they are to be employed in surface coating compositions such as aqueous or emulsion paints, the emulsions or solutions must form a water resistant film or coating. The so-called powdered paints which are dispersed into water to form aqueous paints are well known and have been widely used. For example, a powdered vehicle or carrier such as casein, starch, animal glue, natural gum, polyvinyl alcohol or the like is admixed with a pigment. In use, to this powder paint is added water or a dilute alkaline aqueous solution and, if necessary, it is heated to dissolve the vehicle, so as to make up the aqueous or emulsion paint. While this powder composition has advantages that it can be stored for a considerably long time without degradation and is convenient in transportation, the vehicle or carrier employed is inherently hydrophilic or affinitive with water so that the film or coating formed therefrom has not been water proof or water resistant.

Therefore, it is another object of this invention to provide a novel surface coating composition comprising a modified polyvinyl acetate powder admixed with an ammonium salt of a weak acid and an oxide and/or hydroxide of a heavy metal, which composition can be quite easily dispersed into water to form an emulsion or dispersion from which a water resistant coating film can be formed. The composition may further contain usual pigments and other conventional fillers.

Other objects, features and advantages of the invention will be fully understood from the following detailed explanation:

As hereinbefore described, modified polyvinyl acetate powders according to this invention are produced by copolymerizing vinyl acetate with monomers(s) containing an acid group and copolymerizable with vinyl acetate and then spray drying the resultant emulsion or solution.

POLYMERIZATION

In carrying out the copolymerization any monoolefinic carboxylic acid which is copolymerizable with vinyl acetate can be used as the monomer containing an acid group. Examples of such monomers are crotonic acid, maleic anhydride, itaconic acid, acrylic acid, methacrylic acid, etc. According to this invention vinyl acetate may be copolymerized with any one or more than two of the above mentioned acid monomers.

The copolymerization may be carried out by any known usual or conventional manner for polymerizing vinyl acetate except a desired amount of the acid monomer(s) is introduced in the reaction system.

Particularly when it is desired to produce modified polyvinyl acetate containing up to about 10 molar percent of copolymerized acid monomers(s), a well known emulsion polymerization procedure is preferable. Thus, for example, a round bottomed flask provided with a stirrer, reflux condenser, thermometer and tap funnel is charged with an aqueous solution of a surface active agent and water soluble high molecular substance (known and sometimes referred to as protective colloid) in a predetermined amount. While stirring and externally heating the mixture at a predetermined temperature, a catalyst or polymerization initiator is added and a mixture of vinyl acetate and acid monomers(s) in a desired proportion is introduced therein. The stirring and heating are continued until the completion of the desired copolymerization.

As for the surface active agents, any one which is commonly used in the art of emulsion polymerization of vinyl acetate may be employed. Examples of the surface active agents are nonionic surface active agents such as polyoxyethylene alkyl phenol ethers, alkyl ethers or alkyl esters of polyoxyethylene glycol, polyoxyethylene alkylamides, polyoxyethylene alkanesulfoamides, etc. which are known as ethylene oxide type. Further examples are of diethanolamine type such as alkyldiethanolamides, alkoxyalkylolamines, etc.; anhydrosorbitol type such as alkyl esters of anhydrosorbitols; and block copolymers of ethyleneoxide and propyleneoxide. The amount of the surface active agent to be employed is not critical and may be varied over a wide range.

For the protective colloids, synthetic high molecular substances such as polyvinyl alcohol, polyacrylamide, etc., and natural high molecular substances such as gum arabic, British gum, starch, animal glue, alginic acid and its salts, etc. may be used. The amount of the protective colloid to be employed is not critical and may be varied over a wide range depending upon the particular colloid employed and other reaction conditions involved.

The total amount of the surface active agent and the protective colloid is preferably about 1–10% (based by weight upon the monomers employed) when it is desired that the emulsion resulting from the copolymerization reaction contains about 40 to 60% solid as in the usual case. If the amount is too small, it would be difficult to obtain a stable emulsion, while if an excess is used water-resistance of the film to be formed from the emulsion will be decreased. However, in those cases where starch is employed as the protective colloid so as to introduce into the emulsion the desired characteristics of the starch, an excessive amount may be used.

As regards the catalysts or initiators, water soluble peroxides such as hydrogen peroxide, cumen hydroperoxide, etc. and water soluble persulfates such as potassium persulfate, ammonium persulfate, etc. are preferred, although not limited thereto. By employing these compounds together with reducing agents such as thiosulfites, thiosulfides, ferrous sulfate, etc. (these catalyst compositions are known as redox catalysts or initiators), and/or by utilizing ultra violet rays or radioactive high energy rays, it is possible to effect the copolymerization reaction at a lower temperature. The amount of the catalyst is preferable to be about 0.05–5% by weight based upon the monomers, particularly 0.1–2 weight percent to carry out the reaction smoothly.

The temperature under which the copolymerization is carried out may be about 50–90° C., but a lower temperature can be employed when a redox catalyst or radiation procedure is used as stated before.

The time required for completing the copolymerization varies depending upon the amount of monomers, the particular catalyst employed, temperature etc., but generally the reaction is completed within about 30 minutes to 10 hours.

Where a modified polyvinyl acetate containing more than about 10 molar percent of copolymerized acid monomer is to be produced the so-called solution polymerization procedure is preferable to obtain a homogeneous copolymer.

Any of the solvents which are commonly used in the conventional solution polymerization of vinyl acetate may be employed. Examples of these solvents are aliphatic alcohols, ketones or esters such as ethanol, methanol, acetone, and their ethyl acetates; and aromatics such as benzene, toluene, xylene, etc. When copolymers containing more than about 20–30 molar percent are to be produced, water may be employed as they are water soluble. A mixture of water and water miscible organic solvent may be also employed depending upon the acid monomer content in the copolymer to be produced.

Reaction conditions such as catalysts or initiators, reaction temperatures and time may be similar to those described above in respect of the emulsion polymerization. However, the particular condition should be selected depending upon the particular solvent employed. As for catalysts, an organic catalyst or initiator such as benzoyl peroxide, azoisobutyronitrile, etc. is usually employed where an organic solvent is used. However, when water is used as the solvent those catalysts or initiators employed in the emulsion polymerization may be used.

Since the copolymerization to produce modified polyvinyl acetate may be carried out by any suitable known or conventional manner for producing polyvinyl acetate, except that a mixture of vinyl acetate and acid monomer is employed in place of vinyl acetate alone, and the actual procedures and conditions can be quite easily determined or selected by those skilled in the art, it would be unnecessary to further explain about the copolymerization procedure.

The polymerization degree is not critical except that it should be higher than about 500, preferably higher than 1,000.

SPRAY-DRYING

We have found that satisfactory modified polyvinyl acetate powder according to this invention are prepared by spray-drying processes which themselves are known and have been used in the art of drying foods, spices, synthetic detergents and the like. Thus the emulsions or solutions of modified polyvinyl acetate prepared by the emulsion polymerization or solution polymerization process explained hereinbefore are subjected to spraying processes through a known spray-dryer. Since such spray-drayers are well known per se, it would be unnecessary to explain the detailed structure working and operation thereof. Generally, such spray-dryer consists of a hollow cylindrical chamber having a conical bottom connected through a cyclone separator to an exhaust fan. Hot drying air is introduced into the chamber through a conduit extending into or connected to a top portion of the chamber. A nozzle for spraying the emulsion or solution into the chamber is provided. Said nozzle is associated with a compressed air ejector such as a spray gun or with a centrifuging device to force and spray the emulsion or solution into the chamber. A cold air inlet may be provided in the chamber so as to control the drying temperature if desired. Due to the hot air, the moisture or solvent in the sprayed particles is evaporated and the dried and finely divided particles of the modified polyvinyl acetate are collected at the bottom of the chamber and also in the cyclone separator, while the vapor is discharged from the exhaust fan. An example of the spray-dryer is disclosed in United States Patent No. 2,800,463 and further reference may be made to pages 838–845, "Chemcal Engineers' Handbook" (1950). The sprayer may be centrifugal type or compressed air nozzle type. Generally, in case of the former there is obtained relatively uniform particle size distribution, while in case of the latter there is obtained smaller particle size. The hot drying air may be of a temperature within the range from 50 to 100° C. and the exhaust temperature is preferable to be 40–70° C. to obtain re-emulsifiable powders of this invention. If the modified polyvinyl acetate powders to be produced are soluble in an aqueous alkali solution the temperature of the hot air may be higher, for example up to 120–130° C. The powders thus obtained are finely divided dry particles (particle size being about 5 to 100 microns in average diameter) and containing moisture or organic solvent less than 2–3%.

In carrying out the spray drying process, a higher solid content or concentration of the emulsion or solution is preferable so as to reduce the required thermal energy. However, when the solid content is relatively high the viscosity of the emulsion or solution is high and consequently there is obtained a powder product having a relatively large particle size which would cause relatively poor re-emulsifiability or re-dispersibility. Therefore, it is convenient to dilute the emulsion or solution, before subjecting to the spray drying process, so as to be about 10–55%, preferably about 20–40% solid content, in case of emulsion and about 10–30% solid content in case of solution.

As hereinbefore mentioned and as will be described in detail hereinlater, the invention contemplates mixing the modified polyvinyl acetate with an ammonium salt of a weak acid and an oxide and/or hydroxide of a polyvalent metal. In this case, it is preferable to add the ammonium salt in the emulsion or solution and then subject the mixture to the spray drying. In this way powders wherein the ammonium salt is uniformly distributed are obtained. Alternatively, such ammonium salt may be separately added to the modified powders after they are spray dried.

We have found that modified polyvinyl acetate finely divided powders thus obtained have various interesting and useful properties depending upon the content of the acid monomer copolymerized with vinyl acetate.

RE-EMULSIFIABLE OR RE-DISPERSIBLE MODIFIED POLYVINYL ACETATE POWDERS

It has been found that modified polyvinyl acetate powders thus obtained and containing about 0.3 to 3 molar percent of copolymerized acid monomer are not soluble but swell in an aqueous alkali solution to various extent depending upon the acid component content. It has also been found that these powders are more easily re-emulsifiable or re-dispersible in water than conventional unmodified polyvinyl acetate powders. This capacity of re-emulsification or re-dispersion has been found to be further remarkable when an aqueous alkali solution is employed instead of water. We have further found that the emulsions thus reconstituted are more stable over long periods of time than those reconstituted from the commercially available unmodified polyvinyl acetate powders.

Re-emulsifiabilities in water and an aqueous alkali solution of various polyvinyl acetate (unmodified) powders have been compared with those of various polyvinyl acetate powders modified and prepared according to this invention. The re-emulsifiability or re-dispersibility has been determined as follows:

A beaker (6 cm. in diameter, 8 cm. in depth and 200 ml. in volume) fitted with a stirrer driven at a speed of about 1,000 r.p.m. was filled with 50 cc. of water or an aqueous alkali solution (refer to the following table). While stirring, 50 g. of sample powders were added. After the addition the mixture was further stirred for 15 minutes to effect the dispersion. An observation of this emulsion through a microscope will show small particles with Brownian movement and large particles which had been contained in the sample powders. This emulsion was poured into a measurable or scaled sedimentation tube and was left standing. For another test the same emulsion was diluted so as to be 10% solid content and was similarly poured into a measurable sedimentation tube and was left standing. The sedimentation tube was 1.2 cm. in diameter and 40 cm. in depth. The large particles gradually precipitated and sedimentarily settled at the bottom of the tube. After 24 hours the volume (cc.) of the deposit or settled portion was measured to determine the re-dispersibility or re-emulsifiability of the sample employed. Obviously, the volume of the deposit or settled portion is large if the re-dispersibility of the sample powders is poor. The result was as indicated in the following table.

*Re-Emulsifiability of Various Modified and Unmodified Polyvinyl Acetate Powders*

| Sample | Original emulsion from which the powders were prepared | | | | Solid content at spray drying, weight percent | Average dia. of particle (μ) | Redispersion medium | Deposit vol. (cc.) | |
|---|---|---|---|---|---|---|---|---|---|
| | Particle dia. μ | C.p.s. (30° C.) | Solid cont., weight percent | Composition | | | | Solid cont. 50 percent | Solid cont. 10 percent |
| Commercial A | 0.5 | 1,500 | About 50 | PVAc | 25 | 10 | Water | 3.1 | 4.5 |
| Commercial B | 0.1 | 10,000 | do | PVAc | 25 | 15 | do | 3.5 | 5.0 |
| No. 1 | 1.5 | 500 | do | VAc, CA | 35 | 15 | do | 2.5 | 3.5 |
| No. 2 | 1.5 | 500 | do | VAc, CA | 35 | 15 | 1% NaOH | 0 | 1.0 |
| No. 3 | 0.2 | 1,000 | do | VAc, MAH | 25 | 10 | 1% NH₄OH | 0.2 | 1.5 |
| No. 4 | 0.2 | 2,000 | do | VAc, CA | 30 | 10 | 1% NH₄OH | 0 | 0.5 |
| No. 5 | 1.5 | 1,000 | do | PVAc | 25 | 10 | 1% NH₄OH | 0.3 | 4.0 |

NOTE.—VAc, CA=copolymer of vinyl acetate 98 and crotonic acid 2. VAc, MAH=copolymer of vinyl acetate 98.5 and maleic anhydride 1.5.

Re-emulsifiability or re-dispersibility of powders should vary depending upon the particular emulsifying agent and protective colloid and their amount employed. Therefore, to make the comparison fully significant in the above table, Nos. 1 and 2 have been prepared under the same conditions wherein 9% of gum arabic and 1% of polyoxyethylene nonylphenol, by weight based upon the monomers employed, have been used in the copolymerization reaction. Similarly, Nos. 3, 4 and 5 have been prepared under the same conditions wherein 4% of gum arabic, 4% of hydroxyethyl cellulose and 2% of polyoxyethylene nonylphenol, by weight based upon the monomers employed, have been used in the copolymerization reaction. In any case, each emulsion as originally prepared was spray-dried by using a common centrifugal type spray-dryer wherein the hot air was of the temperature 80° C. and the exhaust temperature was maintained at 50° C.

It will be seen from the various data contained in the above table that the modified polyvinyl acetate powders containing copolymerized acid monomers according to this invention show considerably improved re-emulsifiability or re-dispersibility and that this capability is remarkable particularly when an aqueous alkali solution is employed as the medium into which the powders are to be re-dispersed. It will further be appreciated that when re-dispersed in an aqueous alkali solution the emulsion so reconstituted is almost not inferior to the original emulsion from which the powders were manufactured. In contrast thereto, powders of polyvinyl acetate alone or unmodified polyvinyl acetate are inferior in re-dispersibility or re-emulsifiability to those modified according to this invention, and the emulsion reconstituted therefrom contains a relatively large amount of sedimentable or precipitable large particles which would cause undesirable properties in the film or coating formed from the reconstituted emulsion.

When this modified polyvinyl acetate powder is re-emulsified or re-dispersed into an aqueous solution in such a volume as to be equal to that of the original emulsion, the reconstituted emulsion is generally higher in viscosity than that of the said original emulsion. However, when the reconstituted emulsion is neutralized with any suitable acid such as hydrochloric acid, sulfuric acid, phosphoric acid or acetic acid, the viscosity is lowered and there is reproduced an emulsion which is substantially identical with the original emulsion from which the powder was manufactured. From the so reconstituted or reproduced emulsion (neutralized) may be formed a film which is smooth and water resistant and is comparable with those films which are formed from commercial aqueous emulsions of polyvinyl acetate. Furthermore, owing to the existence of the copolymerized acid monomer(s), these films according to this invention are excellent in adhesiveness.

An aqueous alkali solution into which modified polyvinyl acetate powders containing about 0.3 to 3 molar percent of copolymerized acid monomer may conveniently be re-dispersed according to this invention may be a dilute aqueous solution of an alkaline substance such as potassium hydroxide, sodium hydroxide, ammonia, amines, strong alkali salts of weak acid such as sodium carbonate, sodium borate, etc. It is preferable, however, to use a volatile alkaline substance such as ammonia when coating compositions are contemplated, because the volatile substance will volatilize gradually from the coating or film formed from the emulsion so that the film is rendered water-proof or water-resistant; whereas when a non volatile alkaline substance is used it remains in the film so that the film would be water adsorptive.

An aqueous alkaline solution which may be used as the aqueous medium for the re-emulsification is preferable to contain an alkaline substance in an amount 0.5 to 3 times the stoichiometrical equivalency of the acid monomer(s) as contained in the copolymer. The modified polyvinyl acetate powder may be re-emulsified in water in any concentration or solid content. Thus, for example, there can be reconstituted an emulsion with a concentration ranging from 1–10% to an extremely high concentration of about 70–80% or more which is impossible to be attained in the usual copolymerization procedure. Similarly the modified polyvinyl acetate powder may be re-emulsified in an aqueous alkali solution in a wide range of solid content. The range, however, varies depending upon the monomer content in the powder and the concentration of the alkali solution.

MODIFIED POLYVINYL ACETATE POWDERS SOLUBLE IN WATER OR ALKALI SOLUTION

It has further been found that modified polyvinyl acetate powders (spray-dried) containing more than about 3 molar percent of the copolymerized acid monomer are soluble in an aqueous alkali solution, and become soluble even in water when the copolymerized acid monomer content in the modified polyvinyl acetate is more than 20 molar percent.

Spray-dried and finely divided modified polyvinyl acetate powders belonging to this class are quite easily soluble as compared with known soluble granular or pearl like ones. These finely divided powders can be premixed uniformly with various other powders such as starch, pigments and the like so that they are quite convenient in the use. Nevertheless, nothing has been reported in the previous literatures as to these finely divided and soluble modified polyvinyl acetate powders and no such product has appeared on the market.

More particularly, modified polyvinyl acetate powders containing 3 to 10 molar percent of copolymerized acid monomer dissolved in an aqueous alkali solution give a surface smooth film or coating so that they are particularly useful as vehicles for various surface coating compositions such as water thinnable powder paints as hereinlater explained. Modified polyvinyl acetate powders containing more than 10 molar percent of acid monomers are useful as warp sizing agents, paper sizing agents and the like.

Aqueous alkali solutions which may be employed to dissolve these modified polyvinyl acetate powders may be those described before in respect of a re-emulsifiable powders.

All the modified polyvinyl acetate powders mentioned hereinbefore, namely those containing 0.3 to 50 molar percent of copolymerized acid monomers are soluble in various organic solvents or mixtures of organic solvents and water depending upon the content of the acid monomers. These solvents may be those described before in respect of the solution polymerization procedure. Therefore these powders can be used as dissolved in these organic solvents, although such is not preferable in view of economy, toxicity and possibility of fire or explosion.

Furthermore, any of the modified polyvinyl acetate powder products is useful in various applications as alone or as mixed other components or ingredients. For example, when adhesives are intended, the powder may be mixed with a well known prepolycondensate of various adhesive resins such as dimethylol urea, trimethylol melamine as described in some examples hereinlater given.

COMPOSITIONS CONTAINING MODIFIED POLYVINYL ACETATE POWDERS

As hereinbefore described modified polyvinyl acetate powders containing more than about 0.3 molar percent of copolymerized acid monomers according to this invention are readily re-emulsifiable (re-dispersible) or soluble particularly in an aqueous akali solution depending upon the degree of modification or content of the copolymerized acid monomers. These modified polyvinyl acetate powders, particularly those containing about 0.3 to 10 molar percent (preferably 3 to 10 molar percent of copolymerized acid monomers have been found to be useful as vehicles for various surface coating compositions to be applied in the form of emulsion or solution in an aqueous alkali solution. If the acid monomer(s) content is higher than about 10 molar percent, there would be obtained no satisfactory water resistance in the coating films.

As hereinbefore mentioned, water-resistance or water-absorptivity of films formed from reconstituted emulsions or solutions produced by re-dispersing or dissolving the modified polyvinyl acetate powders according to this invention varies depending upon the particular alkaline substance constituting the alkalinity of the said aqueous solution. Thus, for example, when a hydroxide of a monovalent alkali metal such as sodium or potassium is employed, the acid monomers would be stabilized forming their sodium or potassium salts so that the film would permanently be rendered water soluble or relatively highly water absorptive. When hydroxides or oxides of polyvalent metals such as calcium, zinc, etc. are used, the powder is not satisfactorily re-dispersed or dissolved because of the fact that the solubility of the salts of acid monomers and calcium or zinc into water is small and of the fact that there is formed crosslinking structure due to the intermolecular salt formation.

On the contrary, when a volatile base such as ammonia employed it not only facilitates the dissolution or re-emulsification (re-dispersion) of the powders but also volatilizes from the film formed from the solution or emulsion so that the acid monomer components in the copolymers are converted from the ammonium salts to the original free acid state with the result that the film is rendered water-resistant or non water-absorptive.

Thus, the use of an aqueous alkali solution of a volatile substance such as ammonia is highly recommended in making up solutions or emulsions of the modified polyvinyl acetate powders for coating purposes. However, it is inconvenient or troublesome to prepare such aqueous alkali solution each time when the modified powders (alone or with admixed fillers, pigments or the like) are to be used. Further, this would seriously limit the usefulness of the powders. Thus, it may be considered to deliver the modified polyvinyl acetate powders as pre-admixed with an alkaline substance so that the purchaser or user may make up solutions or emulsions upon simple mixing with water. However, there is no suitable alkaline substance in the form of powder which can be premixed with the modified polyvinyl acetate powders to render the same readily water soluble or re-dispersible to form solutions or reconstituted emulsions from which water resistant films can be formed.

We have found that when powders of ammonium salts of weak acids and oxides and/or hydroxides of polyvalent metals are premixed with the modified polyvinyl acetate powders there is obtained a stable powder product which is readily soluble or re-emulsifiable (re-dispersible) upon simple mixing with water to reconstitute solutions or emulsions from which water resistant films can be formed.

Typical examples of the ammonium salts of weak acids are inorganic salts such as ammonium carbonate; aliphatic carboxylic acid salts such as ammonium acetate, ammonium oxalate, ammonium tartrate; and aromatic carboxylic acid salts such as ammonium benzoate. However, finely divided powders with low moisture absorptivity are preferably to mix the same uniformly with the modified polyvinyl acetate powders and produce a stable product. For this purpose, ammonium oxalate powders are particularly preferred.

Typical examples of the oxides and hydroxides of the polyvalent metals are zinc oxide, calcium oxide, calcium hydroxide, zinc hydroxide, etc.

As already mentioned, the hydroxides or oxides of polyvalent metals alone are used there is obtained no sufficient solubility or re-emulsifiability of the modified polyvinyl acetate powders. The same is applied to those cases where ammonium salts of weak acids alone are employed. It is, accordingly, quite unexpected that by combining the ammonium salts of weak acids with the oxides and/or hydroxides of polyvalent metals there is obtained an excellent result in respect of sufficient solubility or re-emulsifiability of the modified polyvinyl acetate powders as well as the formation of water resistant films. The theoretical reason for this fact has not yet fully been ascertained, but it is deemed that the ammonium salts in the presence of the hydroxides or oxides and water dissociate to produce free ammonia which forms salts with the acid monomers copolymerized with vinyl acetate to render the copolymer readily water soluble or re-emulsifiable. After formation of films from the solutions or emulsions, said ammonia volatilizes therefrom in the course of drying. The hydroxides or oxides of polyvalent metals remaining in the films have considerably low solubility in water and they partly form crosslinking structure in the films, and therefore water resistance of the films is not adversely affected thereby but is rather improved.

This theory is largely supported by the following experimental data. A spray dried copolymer (20 g.) of crotonic acid (4 molar percent) and vinyl acetate (96 molar percent) was dispersed in 80 g. of water. Since this is an emulsion or dispersion the viscosity is very low, the copolymer being insoluble in water. When an alkaline substance is added to this emulsion the particles suspending in water swell and dissolve therein so that the viscosity increases. If the dissolution is none or incomplete the viscosity increase is little. To this emulsion, various powdered substances were added and viscosity increase (after 1 hour) was measured in each case as follows:

| Exp. | Added substances. | C.p.s. at 30°C. |
|---|---|---|
| 1 | None | 5> (unmeasurable). |
| 2 | CaO, 0.6 g | Do. |
| 3 | Ca(OH)$_2$, 0.8 g | Do. |
| 4 | ZnO, 0.8 g | Do. |
| 5 | Amm. oxalate, 1.6 g | Do. |
| 6 | Amm. oxalate, 1.6 g.; CaO, 0.6 g | 92,000 |
| 7 | Amm. oxalate, 1.6 g.; Ca(OH)$_2$, 0.8 g | 88,000 |
| 8 | Amm. oxalate, 1.6 g.; ZnO 0.8 g | 1,100 |

It will be noted from the above that the addition of a single substance alone is not effective in solubilizing the copolymer, but when the weak acid salt of ammonium is combined with the oxide or hydroxide the solubilizing effect is remarkable. Furthermore, in case of Exp. Nos. 6, 7 and 8 an odor which is characteristic of ammonia was noticed, but not in respect of Exp. Nos. 2, 3, 4 and 5.

The amount of these alkaline compounds to be admixed with the modified polyvinyl acetate powders is not critical and varies depending upon the content of the acid monomers copolymerized and the particular use of the powders. Generally, the use of the ammonium salt in an amount about one to two times the stoichiometric equivalent with respect to the amount of the acid monomers is satisfactory. The proportions of the ammonium salts, oxides and/or hydroxides may also vary within a wide range. Generally, 0.5–2 moles of the oxide or hydroxide per mole of the ammonium salt are satisfactory.

The ammonium salt and the oxide and/or hydroxide of polyvalent metal in the form of powder may be separately added to the spray dried modified polyvinyl acetate powder. It is preferable, as mentioned before, to add the ammonium salt in emulsion or solution before spray drying, and then subject the ammonium salt containing emulsion or solution to spray drying so that there is obtained a modified polyvinyl powder product in which the ammonium salt is evenly distributed. To this power is separately added the oxide and/or hydroxide and mixed together. The so combined or mixed powder product can be stored for long periods of time with stability and can be quite easily dissolved or re-emulsified in water upon simple addition of water, and films formed from the solutions or emulsions are water resistant. Therefore, these solutions and emulsions are useful in those applications where conventional polyvinyl acetate (modified or not modified) emulsions or solutions have been used heretofore.

Thus, for example, pigments, fillers and the like conventionally employed in the art of aqueous or water thinnable paints or coating compositions can be admixed with the combined powers according to this invention. When the mixture is mixed with water there is produced a high viscosity aqueous paint from which can be formed a coating film which does not swell or peel away even when immersed in water (room temperature) for one month or more.

When pigments, fillers or the like are to be added to the power product or composition of this invention it would be understood that they must be those which do not adversely affect the effect of the alkalinity in the emulsion or solution because, as mentioned before, this alkalinity is the important factor which improves the re-dispersibility or solubility of the modified power product in water. Thus, titanium oxide, mica, talc, kaolin, etc. can be employed as pigments and fillers to be combined with the power product of this invention.

The following examples are given which are illustrative of the practice of our invention and are not intended for purposes of limitation. In the examples all parts are by weight unless stated otherwise. Throughout these examples re-emulsifiability or re-dispersibility was determined by the procedure as hereinbefore explained in respect of the before indicated table and expressed as the volume (cc.) of deposition. In each of these examples, a model type sprayer marketed by Iwai Kikai Kogyo Kabushiki Kaisha, Japan, was employed. This sprayer is substantially identical in type with that disclosed in U.S. Patent No. 2,800,463. The atomizer was replaceable and therefore it was replaced with a centrifugal type atomizer or a compressed air nozzle type atomizer as described in the examples.

EXAMPLE 1

441 g. of vinyl acetate and 9 g. (2 mol percent) of crotonic acid were copolymerized by the emulsion polymerization procedure wherein 4.5 g. of polyoxyethylene nonylphenylether (emulsifier), 40 g. of gum arabic (protective colloid), 1 g. of ammonium persulfate (catalyst or initiator) and 505 cc. of water were employed, at 70° C. for 6 hours. The emulsion thus obtained was 49.8 weight percent in solid content, 510 cps. (at 30° C.) in viscosity and particle size was 1.5$\mu$ in average diameter. The emulsion was diluted with water to be 35% solid content and was spray dried by centrifugally atomizing a stream of the diluted emulsion at the rate of 1 liter/hour in a spray dryer wherein the hot air temperature was 80° C. and the exhaust temperature was 50° C.

The dried powder (15$\mu$ in average diameter) has the following re-emulsifiability.

| Deposit, cc. | Solid content, percent | Medium |
|---|---|---|
| 2.5 | 50 | Water. |
| 3.5 | 10 | Do. |
| 0 | 50 | 1% NaOH. |
| 1.0 | 10 | 1% NaOH. |

EXAMPLE 2

443.2 g. of vinyl acetate and 6.8 g. (1.3 mol percent) of maleic anhydride were copolymerized by the emulsion polymerization procedure wherein 9 g. of polyoxyethylene nonylphenylether, 18 g. of hydroxyethyl cellulose, 18 g. of gum arabic, 2.25 g. of ammonium persulfate and 500 cc. of water were employed, at 70° C. for 8 hours. The emulsion thus obtained was 49.5 weight percent in solid content, 1,050 cps. (at 30° C.) in viscosity and particle size was 0.2$\mu$ in average diameter. The emulsion was diluted to be 25% solid content and spray dried as in Example 1.

The dried powder (particle size, about 10$\mu$ in average diameter) could be dispersed in water with the following dispersibilities:

| Deposit, cc. | Solid content, percent | Medium |
|---|---|---|
| 0.2 | 50 | 1% NH$_4$OH. |
| 1.5 | 10 | 1% NH$_4$OH. |

EXAMPLE 3

441 g. of vinyl acetate and 6 g. (1.33 mol percent) of crotonic acid and methacrylic acid 3 g. (0.67 mol percent) were copolymerized by the emulsion polymerization procedure wherein 20 g. of completely hydrolized polyvinyl alcohol (average polymerization degree 500), 5 g. of partly (88%) hydrolized polyvinyl alcohol, 5 cc. of 30% hydrogenperoxide and 0.8 g. of tartaric acid and 495 cc. of water were used, at 70° C. for 6 hours. The emulsion thus obtained was 49.9 weight percent in solid content, 2,020 cps. (at 30° C.) in viscosity and the particle size was about 1$\mu$ in average diameter. The emulsion was diluted with water so as to be 30 weight percent in solid content and was spray dried by atomizing (by means of a spray gun operated at a pressure of about 1.5 atmospheric pressure) a stream of the diluted emulsion at the rate of 1 liter/hour in a spray dryer wherein the hot air temperature of 75° C. and the exhaust temperature was 45° C.

The dried powder (particle size, 10$\mu$ in average diameter) could be easily re-emulsified with the following emulsifiability:

| Deposit, cc. | Solid content, percent | Medium |
|---|---|---|
| 0 | 50 | 1% NH$_4$OH. |
| 0.5 | 10 | 1% NH$_4$OH. |

EXAMPLE 4

In this example, vinyl acetate alone was polymerized. 450 g. of vinyl acetate was polymerized by the emulsion polymerization procedure wherein 9 g. of polyoxyethylene nonylphenylether, 18 g. of hydroxyethyl cellulose, 18 g. of gum arabic, 0.45 g. of potassium persulfate were used, at 65° C. for 6 hours. The emulsion thus obtained was 49.8 weight percent in solid content, 1,000 cps. (at 30° C.) in viscosity and the particle size was about 1$\mu$ in average diameter. The emulsion was diluted with water so as to be 25% solid content and spray dried as in Example 1.

The polyvinyl acetate powders thus produced were 10$\mu$ in average particle diameter and did not show good redispersibility as follows:

| Deposit, cc. | Solid content, percent | Medium |
|---|---|---|
| 3.0 | 50 | 1% NH$_4$OH. |
| 4.0 | 10 | 1% NH$_4$OH. |

EXAMPLE 5

The copolymerization and spray drying procedure of Example 1 was repeated except using 448 g. of vinyl acetate and 2 g. (0.45 mol percent) of crotonic acid. The powder product obtained thereby could be easily re-emulsified as follows:

| Deposit, cc. | Solid content, percent | Medium |
|---|---|---|
| 1.0 | 50 | 1% NH₄OH. |
| 2.5 | 10 | 1% NH₄OH. |

EXAMPLE 6

96 parts of vinyl acetate and 4 parts (4 mol percent) of crotonic acid were copolymerized by the emulsion polymerization procedure wherein 5 parts of British gum, 1 part of polyoxyethylene sorbitan monostearate, 0.2 part of ammonium persulfate and 100 parts of water were used, at 65° C. for 8 hours. The emulsion (solid content, about 51 weight percent) was diluted with water so as to be 30 weight percent in solid content and was spray dried by centrifugally (disc rotation, 20,000 r.p.m.) atomizing a stream of the diluted emulsion in a spray dryer wherein the hot air temperature was 80° C. and the exhaust temperature was 50° C.

20 parts of the dried powder product (particle size, 50μ in average diameter) were dissolved in 80 parts of 0.1 N aqueous ammonia and the solution was kneaded with 80 parts of pigment (TiO₂ and talc, 5:5) to prepare an aqueous paint, from which was formed film more excellent in resistance to wet abrasion than that formed from an aqueous paint having similar composition but made from unmodified polyvinyl acetate emulsion.

EXAMPLE 7

90 parts of vinyle acetate and 10 parts (10 mol percent) of crotonic acid were dissolved in 100 parts of methanol and copolymerized in the presence of 0.5 part of αα'-azobisisobutyronitrile (catalyst) and under reflux for 10 hours. The solution obtained was diluted with methanol so as to be 15 weight percent solid content and was spray dried as in Example 6. The dry powder product (particle size, 20μ in average diameter) was quite easily dissolved in 0.5% NaOH solution. The solution so obtained was suitable as warp sizing agent for various synthetic and natural fibres. Desizing could also be easily effected by merely applying an aqueous alkali solution.

EXAMPLE 8

60 parts of vinyl acetate and 40 parts (36 mol percent) of maleic anhydride were dissolved in 100 parts of acetone and copolymerized in the presence of 0.5 part of benzoylperoxide and under reflux for 8 hours. The solution obtained was diluted with acetone so as to be 15 weight percent in solid content and spray dried as in Example 3. The dry powder product (particle size, about 15μ in average diameter) was readily soluble in warm water so that it was useful as sizing agent for paper and warp of various fibres. The powders may be mixed with starch in any desired proportion to produce a powdered sizing agent which is convenient in storing and transportation.

EXAMPLE 9

90 parts of vinyl acetate and 1 part (1 mol percent) of methacrylic acid were mixed in a solution of 2 parts of polyoxyethylene nonylphenyl ether and 5 parts of hydroxyethyl cellulose in 10 parts of water. While effecting polymerization in the presence of 0.5 part of potassium persulfate at 65° C., a mixture of 30 parts of water and 9 parts (9 mol percent) of methacrylic acid were gradually added to the reaction mixture. After 5 hours, an emulsion with 98% of polymerization yield and about 40 weight percent in solid content was obtained. The emulsion was diluted with water to be 30% solid content and was spray dried as in Example 8, and there was obtained powder product having particle size of about 50μ in average diameter. Mortar was prepared from a mixture of 10 parts of the powder and 90 parts of Portland cement, in the usual manner. The flexural strength of this mortar was increased up to 4 times that of a mortar prepared from the same material without containing the resin.

EXAMPLE 10

90 parts of vinyl acetate and 2 parts (2.1 mol percent) of acrylic acid were dissolved in 100 parts of methanol. While carrying out the copolymerization in the presence of 0.2 part of azoisobutyronitrile and under reflux, a mixture of 8 parts (8.7 mol percent) of acrylic acid and 20 parts of methanol was gradually added to the reaction mixture. After 6 hours, a methanol solution of the copolymer was diluted with methanol so as to be 10 weight percent solid content and spray dried as in Example 6 to produce powders with particle size of about 20μ in average diameter. A mixture of 30 parts of this powder product and 70 parts of powdered prepolycondensate of urea-formaldehyde gave, when dissolved in aqueous ammonia, an excellent adhesive agent which is useful for the production of plywoods. After the application of this adhesive agent the laminated wood assembly was subjected to baking at 130° C. for 5 minutes; a strongly bonded plywood was obtained thereby.

EXAMPLE 11

98 g. of vinyl acetate and 2 g. (2 mol percent) of crotonic acid was copolymerized at 65° C. for 3 hours by the emulsion polymerization procedure wherein 1 g. of polyoxyethylene laurylether, 10 g. of gum arabic, 0.3 g. of potassium persulfate, 0.05 g. of sodium bisulfite and 100 g. of water were used. The emulsion obtained was diluted with water so as to be 30 weight percent solid content. This emulsion was thoroughly mixed with 4 g. of ammonium acetate and was spray dried by centrifugally (disc rotation, 1,800 r.p.m.) atomizing a stream of the diluted emulsion at the rate of 1 liter/hour in a spray drier wherein the hot air temperature was 90° C. and the exhaust temperature was 55° C. The white powder product was of particle size about 20μ in average diameter and the volatile content was 2 to 3%.

50 parts of this powder product, 1 part of calcium oxide, 10 parts of urea-formaldehyde prepoly-condensate powder and a mixture of 50 parts of titanium oxide, 50 parts of kaolin and 10 parts of dibutyl phthalate were mixed together and 160 parts of water were added thereto. While stirring the whole mixture the viscosity increased gradually to form an emulsion paint useful for coating purpose. This emulsion paint was applied by a brush on a glass plate surface in an amount of about 1.5 g. of the paint per 10 cm.² of the surface. After 6 hours another film was formed similarly thereon and the glass plate with this coating was dried for 5 days at normal temperature. The glass plate with the dried film thereon was immersed in water (normal temperature) for one month, but no swelling or peeling was noticed.

EXAMPLE 12

96 parts of vinyl acetate and 4 parts (4 mol percent) of crotonic acid were copolymerized at 65° C. for 3 hours by the emulsion polymerization procedure wherein 0.5 part of polyoxyethylene nonylphenyl ether, 3 parts of partially (88%) hydrolyzed polyvinyl alcohol, 0.5 part of ammonium persulfate, 0.1 part of sodium sulfite and 100 parts of water were used. The emulsion obtained in this manner is referred to as emulsion "A."

The emulsion "A" was diluted with water so as to be 25 weight percent solid content, 8 parts of ammonium oxalate were added thereto and the mixture was thoroughly mixed. Then the emulsion was spray dried in the same manner as in Example 11 except that the emulsion feeding rate was 1.3 liters/hour, the hot air temperature was 100° C. and the exhaust temperature was 55° C. The white powder product thus obtained has a particle size of about 15μ in average diameter and its volatile content was 3%. This powder product is referred to as powder (I).

60 parts of the same emulsion "A" was mixed with 40 parts of an unmodified polyvinyl acetate emulsion marketed by Kanegafuchi Spinning Co., Ltd. under the trade name VC–500 and having the solid content of 50%, and added to the mixture were 2.5 parts of ammonium oxalate and 50 parts of water. After thoroughly mixing the whole, the mixed emulsion was spray-dried in the same manner as in Example 11 except that the emulsion feeding rate was 1.2 liters/hour, the hot air temperature was 85° C. and the exhaust temperature was 50° C. The white powder product thus obtained had a particle size of about 25µ in average diameter and its volatile content was 2–3%. The powder product is referred to as powder (II).

To 70 parts of the same emulsion "A" were added 30 parts of acrylic acid ester resin emulsion marketed by Rohm and Haas Co. under the trade name Phoplex AC–33, 2.6 parts of ammonium oxalate and 30 parts of water. After thoroughly mixing the whole, it was spray dried in the same manner as in Example 11 except that the emulsion feeding rate was 1.3 liters/hour, the hot air temperature was 82° C. and the exhaust temperature was 48° C. The white powder product thus obtained had a particle size of about 25µ in average diameter and its volatile content was 2–3%. This powder product is referred to as powder (III).

By using these powder products (I) (II), (III) as vehicles, various aqueous or emulsion paints were prepared as follows:

A mixture of the following powdered ingredients (parts by weight) was prepared:

| | |
|---|---|
| Powder (I) | 100 |
| Zinc oxide | 10 |
| Titanium oxide | 250 |
| Talc | 240 |
| Tricresyl phosphate | [1] 25 |
| Tributyl phosphate | [1] 3 |
| Urea-formaldehyde prepolycondensate powder | 20 |

[1] Premixed with the pigments.

To these mixed powders were added 600 parts of water and stirred while heating to prepare an aqueous or emulsion paint.

A mixture of the following powdered ingredients (parts by weight) was prepared:

| | |
|---|---|
| Powder (II) | 100 |
| Calcium oxide | 3 |
| Titanium oxide | 200 |
| Kaolin | 200 |
| Tricresyl phosphate | [1] 20 |
| Tributyl phosphate | [1] 2 |
| Carboxymethyl cellulose | 1 |

[1] Premixed with the pigments.

To this mixture were added 500 parts of water and stirred at normal temperature or under heating, so that the viscosity gradually increased to produce a stable aqueous or emulsion paint after about 1–2 hours.

A mixture of the following powdered ingredients (parts by weight) was prepared:

| | |
|---|---|
| Powder (III) | 100 |
| Calcium oxide | 4 |
| Titanium oxide | 250 |
| Kaolin | 250 |
| Tributyl phosphate | [1] 3 |
| Methyl cellulose | 1.5 |

[1] Premixed with the pigments.

To this mixture were added 600 parts of water and stirred at normal temperature or under heating to produce a good aqueous or emulsion paint.

Each of these paints was applied by a brush on a glass plate surface in an amount of about 1.5 g. of the paint per 10 cm.$^2$ of the plate surface, and air dried. These glass plates with the dried films were immersed in water at normal temperature for more than one month but no swelling or peeling phenomenon was noticed.

EXAMPLE 13

441 g. of vinyl acetate and 9 g. of maleic anhydride were copolymerized at 70° C. for 5 hours by the emulsion polymerization procedure wherein 9 g. of polyoxyethylene nonylphenyl ether, 20 g. of gum arabic, 2.25 g. of ammonium persulfate and 500 g. of water were used. The emulsion produced was diluted with water so as to be 25 weight percent solid content and 3.8 g. of ammonium oxalate were dissolved therein. Then the emulsion was spray dried as in Example 11 to produce a white powder product having a particle size of about 10µ in average diameter.

30 parts of the powder product and 70 parts of urea-formaldehyde prepolycondensate powders were mixed together to give an excellent adhesive composition which can be easily re-emulsified in water under a high concentration which facilitates rapid drying. A sufficient bonding strength is obtained even by drying under normal temperature. When baked at 120–130° C. for a few minutes it gives a strong and water resistant bondage. This adhesive composition is particularly useful in bonding woods.

We claim:

1. Dry powder composition which comprises a spray dried powder of copolymer of vinyl acetate and about 0.3 to 10 molar percent of at least one mono-olefinic carboxylic acid of 3 to 4 carbons, an ammonium salt of a weak acid having a dissociation constant less than $10^{-1}$, and at least one compound selected from the group consisting of zinc oxide, calcium oxide, zinc hydroxide and calcium hydroxide, said ammonium salt being present in an amount about 1 to 2 times the stoichiometric equivalent with respect to the acid monomer, and the amount of said compound being 0.5 to 2 moles per mole of ammonium salt.

2. Process for producing dry powder composition comprising
   (1) copolymerizing vinyl acetate with at least one mono-olefinic carboxylic acid of 3 to 4 carbons copolymerizable with vinyl acetate to produce liquid admixture containing 10 to 15% as solid content of copolymer in which the copolymerized acid monomer content is about 0.3–10 molar percent,
   (2) dissolving ammonium salt of weak acid having a dissociation constant less than $10^{-1}$ in said admixture, said ammonium salt being about 1 to 2 times the stoichiometric equivalent with respect to said acid monomer,
   (3) spray drying said admixture at a temperature below 130° C. to produce finely divided modified polyvinyl acetate powder in which said ammonium salt is uniformly dispersed, and
   (4) admixing the resultant powder with a member selected from the group consisting of calcium hydroxide, zinc hydroxide, calcium oxide and zinc oxide, said member being 0.5 to 2 moles per mole of ammonium salt.

3. Process for producing dry powder composition comprising
   (1) copolymerizing vinyl acetate with at least one mono-olefinic carboxylic acid of 3 to 4 carbons copolymerizable with vinyl acetate to produce liquid admixture containing 10 to 15% as solid content of copolymer in which the copolymerized acid monomer content is about 0.3–10 molar percent,
   (2) spray drying said admixture at a temperature below 130° C. to produce finely divided modified polyvinyl acetate powder,
   (3) admixing said resultant powder with (a) powdered ammonium salt of an acid having a dissociation constant less than $10^{-1}$ in amount about 1 to 2 times the stoichiometric equivalent with respect to the acid monomer, and (b) at least one member selected from the group consisting of calcium hydroxide, zinc hydroxide, calcium oxide and zinc oxide, said member being in amount of 0.5 to 2 moles of said ammonium salt.

4. Surface coating composition comprising an admixture of water and the composition of claim 1, together with fillers and pigments.

5. Composition of claim 1 wherein the carboxylic acid is a member selected from the group consisting of crotonic acid, maleic anhydride, methacrylic acid, and acrylic acid.

References Cited in the file of this patent

UNITED STATES PATENTS

| | | |
|---|---|---|
| 2,187,877 | Ferris et al. | Jan. 23, 1940 |
| 2,263,598 | Stark et al. | Nov. 25, 1941 |
| 2,795,573 | Barrett et al. | June 11, 1957 |
| 2,800,463 | Morrison | July 23, 1957 |
| 2,966,480 | Wechsler et al. | Dec. 27, 1960 |